United States Patent
Gronat et al.

(10) Patent No.: US 10,984,105 B2
(45) Date of Patent: Apr. 20, 2021

(54) USING A MACHINE LEARNING MODEL IN QUANTIZED STEPS FOR MALWARE DETECTION

(71) Applicant: Avast Software s.r.o., Prague (CZ)

(72) Inventors: Petr Gronat, Prague (CZ); Rajarshi Gupta, Sunnyvale, CA (US); Filip Havlicek, Lanskroun (CZ); Michal Wojcik, Leeds (GB)

(73) Assignee: Avast Software s.r.o., Prague (CZ)

( * ) Notice: Subject to any disclaimer, the term of this patent is extended or adjusted under 35 U.S.C. 154(b) by 272 days.

(21) Appl. No.: 16/193,822

(22) Filed: Nov. 16, 2018

(65) Prior Publication Data

US 2019/0156037 A1 May 23, 2019

Related U.S. Application Data

(60) Provisional application No. 62/588,193, filed on Nov. 17, 2017.

(51) Int. Cl.
*G06F 21/56* (2013.01)
*G06N 5/04* (2006.01)
*G06N 20/00* (2019.01)

(52) U.S. Cl.
CPC .......... *G06F 21/566* (2013.01); *G06N 5/048* (2013.01); *G06F 2221/034* (2013.01); *G06N 20/00* (2019.01)

(58) Field of Classification Search
CPC . G06F 21/566; G06F 2221/034; G06N 5/048; G06N 20/00
See application file for complete search history.

(56) References Cited

U.S. PATENT DOCUMENTS

| | | | |
|---|---|---|---|
| 8,401,982 B1* | 3/2013 | Satish | G06F 21/566 |
| | | | 706/20 |
| 2013/0111588 A1* | 5/2013 | Agrawal | G06F 21/55 |
| | | | 726/23 |
| 2013/0318607 A1 | 11/2013 | Reed et al. | |
| 2014/0090061 A1 | 3/2014 | Avasarala et al. | |
| 2016/0292419 A1 | 10/2016 | Langton et al. | |
| 2016/0337390 A1* | 11/2016 | Sridhara | H04W 12/1208 |
| 2018/0039779 A1* | 2/2018 | Li | G06F 21/56 |

OTHER PUBLICATIONS

Gavriluţ et al., "Malware Detection Using Machine Learning", 2009, IEEE, Proceedings of the International Multiconference on Computer Science and Information Technology, pp. 735-741, ISBN: 978-83-60810-22-4 (Year: 2009).*
OnQ Blog, Snapdragon Smart Protect detects more mobile malware, Aug. 31, 2015, 7 pages, https://www.qualcomm.com/news/onq/2015/08/31/snapdragon-820-countdown-snapdragon-smart-protect-detects-more-mobile-malware. Accessed Feb. 19, 2019.
Qualcomm(R) Snapdragon(TM) Smart Protect, 2015, 1 page, Qualcomm Technologies, Inc.

* cited by examiner

*Primary Examiner* — Jung W Kim
*Assistant Examiner* — Timothy P Hallman
(74) *Attorney, Agent, or Firm* — Erickson Kernell IP, LLC

(57) ABSTRACT

Minimizing the latency of on-device detection of malicious executable files, without sacrificing accuracy, by applying a machine learning model to an executable file in quantized steps. Allowing a threshold confidence level to be set to different values enables controlling the tradeoff between accuracy and latency in generating a confidence level indicative of whether the executable file includes malware.

18 Claims, 9 Drawing Sheets model_steps([0.45, 0.45, 0.45, 0.45, 0.45, 0.45])

```
Picking the next highest model
    thrs = [0.96 - 0.72*((p/m)**2) for p in range(m)] where m = # of events / total time
```

USING A MACHINE LEARNING MODEL IN QUANTIZED STEPS FOR MALWARE DETECTION

CROSS-REFERENCE TO RELATED APPLICATIONS

This Application claims priority to U.S. Provisional Patent Application Ser. No. 62/588,193, filed on Nov. 17, 2017, entitled "Using a Machine Learning Model in Quantized Steps for Malware Detection," the entire disclosure of which is incorporated herein by reference.

FIELD

The disclosure relates generally to computing system security, and more particularly, to using a machine learning model in quantized steps during on-device malware detection.

BACKGROUND

Over time, smart phones have become more capable and their use has increased. However, as a result of this increasing use, smart phones have become a more attractive target for malware. Malware, short for "malicious software," is software that can be used to disrupt device operations, damage data, gather sensitive information, or gain access to private computer systems without the user's knowledge or consent. Examples of such malware include software viruses, trojan horses, rootkits, ransomware etc. Correctly identifying which files or applications contain malware and which are benign can be a difficult task, because malware developers often obfuscate various attributes of the malware in an attempt to avoid detection by anti-malware software.

Machine learning models are trained by executing software packages and feeding the resulting observations into the machine learning model. However, software packages can execute for a very long time (e.g., on the order of minutes), thus generating many observations over the execution period. Conventional techniques build machine learning models with data from a specific period in time or during the occurrence of a certain number of events (e.g., 60 seconds, 1000 events, etc.). Models built using this conventional technique require waiting until a software package under evaluation reaches this same point in time/event. Such techniques are accurate, but the software packages cannot be evaluated until the specific point in time or event is reached, thus resulting in undesirable latency in the identification of malware in the software package. Moreover, using a machine learning model built in this conventional manner to test a short sequence of events (e.g., 5 seconds, 50 events, etc.) results in undesirable false negatives and false positives.

SUMMARY

Systems and methods enable (i) generating a first set of events by executing one or more training files, wherein the first set of events is associated with a domain, and wherein the events of the first set of events are each associated with a corresponding step point of the domain based on the order in which the events are generated during the execution of the training file, (ii) creating a plurality of step models, wherein each step model is trained for the events of the first set of events associated with a particular step point of the domain, (iii) generating a second set of events by executing a second file on a device, wherein the second set of events is associated with the domain, and wherein the events of the second set of events are each associated with a corresponding step point of the domain based on the order in which the events are generated during the execution of the second file, and (iv) applying, on the device, at least two step models of the plurality of step models to the second set of events to generate a confidence level indicative of whether the second file includes malware, wherein each applied step model is applied to the events of the second set of events associated with the step point for which the step model is trained.

BRIEF DESCRIPTION OF THE DRAWINGS

For a better understanding of the inventive subject matter, reference may be made to the accompanying drawings in which.

DETAILED DESCRIPTION

In the following detailed description of example embodiments, reference is made to the accompanying drawings that form a part hereof, and in which is shown by way of illustration specific example embodiments in which the inventive subject matter may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

The description of the various embodiments is to be construed as describing examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

Figure 1:
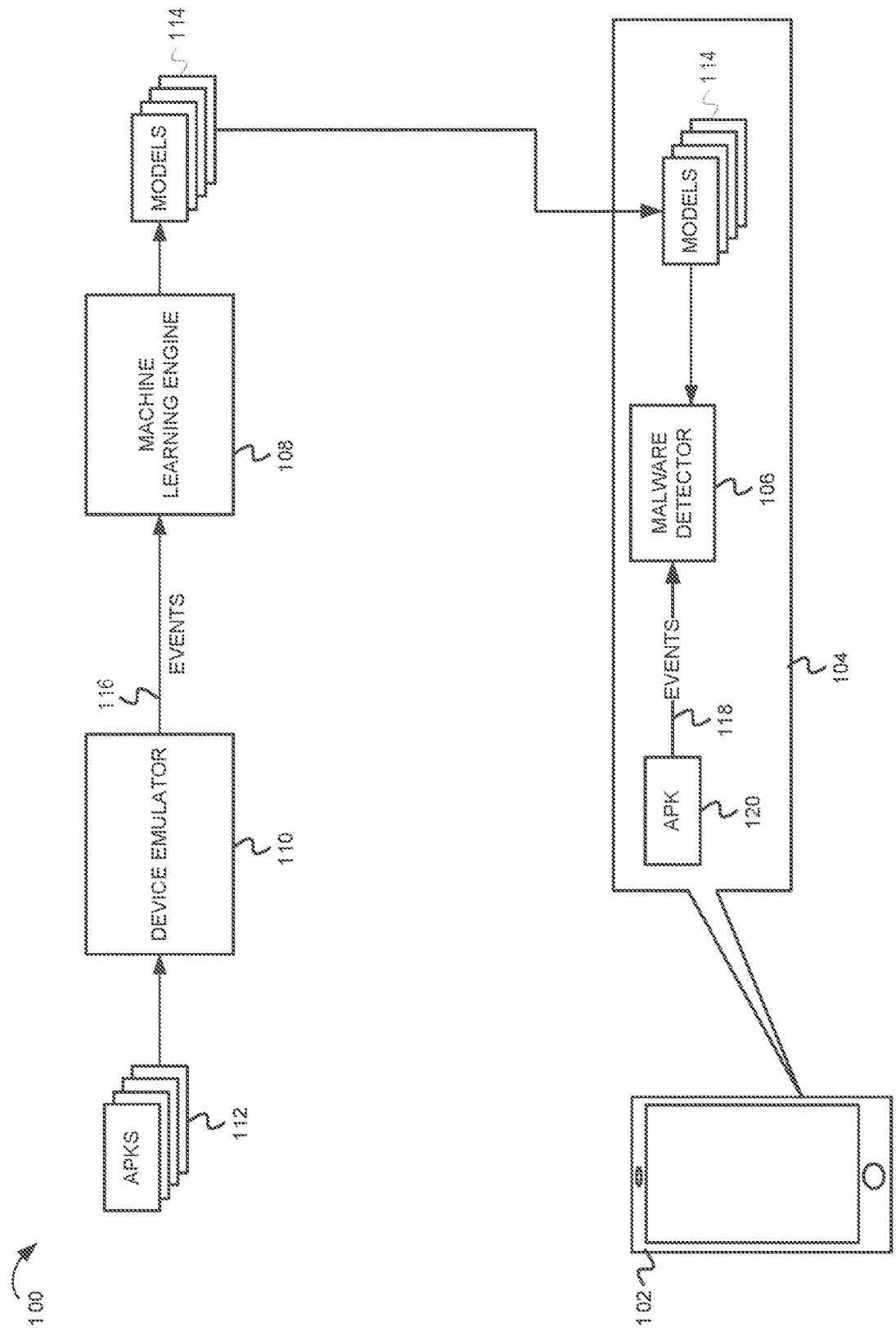
FIG. 1 is a block diagram illustrating components of systems for creating a using machine learning models in quantized steps for malware detection in accordance with one embodiment of the present invention.

FIG. 1 is a block diagram illustrating components of a system 100 for creating and using machine learning models in quantized steps for malware detection. In some embodiments, system 100 includes a machine learning engine 108 that creates models 114 for use in malware detection by a device 102.

The machine learning engine can receive events that occur during the execution of Android Package Kits (APKs) 112. In some embodiments, a training set of APKs can be executed by a device emulator 110. In alternative embodiments, APKs can be executed by a native device. The embodiments are not limited to any particular type of software files. Those skilled in the art will appreciate that the events can be received from the execution of other software packages and/or executable files, such as Portable Executable (PE) files, Universal Windows Platform (UWP) applications (e.g., APPX file formats, etc.), Debian packages, iOS App Store Package files, and the like, for example. As an APK in the training set executes, a series of events 116 associated with the executing APK is observed by the machine learning engine 108. The series of events 116 may be referred to as a time series in some embodiments because the events 116 are a series of data points indexed or arranged in the order in which they occurred. In some embodiments, the events can be inter-process communication events that occur between an application and a service. For example, the events can be Android Binder events or iOS XPC events. In alternative embodiments, the events can be system calls and/or Android framework calls. The embodiments are not limited to any particular type of events.

The series of events can be associated with a time domain and/or an event domain. Step points can be established for the time domain and the event domain. For example, for the time domain, the step points can be at the 2 second, 4 second, 8 second, 16 second, 32 second and 64 second points in the event stream 116. Similarly, for the event domain the step points can occur after 32 events, 64 events, 128 events, 256 events, 512 events, and 1024 events have been received. A machine learning model can be trained for each of the different step points in the time domain and event domain. Thus, the set of models 114 can include models that are each associated with a different step point within each domain. A model associated with a particular step in the event domain or time domain will be referred to as a step model.

Exponential time steps based on factors of two has been discovered by the inventors as a desirable way to provide stepped increases as much of the activity of an APK often happens at the beginning of execution of the APK. Thus, frequent model steps are desirable. In some embodiments, 2 seconds and 32 events are used as a minimum amount of time/number of events used to classify an APK. In some embodiments, 64 seconds and 1024 events can be used as a sufficient amount of time/number of events in order to classify an APK with a high level of confidence. Those of skill in the art having the benefit of the disclosure will appreciate that other time periods, event counts, minimums and maximums may be used and such parameters are within the scope of the inventive subject matter.

After a set of models 114 has been created and trained, the models can be provided to a device 102. In some embodiments, device 102 can be any type of smartphone. However, the inventive subject matter is not limited to smartphones, and in alternative embodiments, device 102 can be a tablet computer, a media player (e.g., MP3 player), a laptop computer, a desktop computer, etc. In some embodiments, device 102 executes the Android operating system. In alternative embodiments, the device 102 executes a version of the Linux operating system. In further alternative embodiments, the device 102 can execute a version of the Windows or iOS operating systems.

Device 102 can include a software environment 104 in which APKs execute. Software environment 104 can include a malware detector 106 that uses the set of models 114 to determine if an APK 120 is, or contains, malware. The malware detector 106 can be part of an anti-malware suite of software. In some embodiments, an APK 120 can be selected for execution. As the APK 120 executes, a sequence of events 118 is provided to malware detector 106. In some embodiments, an observer component of the software environment 104 observes the sequence of events 118 generated by the executing APK 120 and relays the observed events to malware detector 106. Alternatively, the observer processes the observed events 118 to extract features (e.g., relevant information, typically numerical) from the observations and relays the extracted feature information to malware detector 106.

Malware detector 106 receives the sequence of events 118. In some embodiments, the malware detector 106 can apply a coarse evaluation of events. In a coarse evaluation, the sequence of events 118 is evaluated at the respective step points in the event domain or time domain. For example, when the elapsed time or number of events reaches a first step (e.g., 2 seconds or 32 events), the malware detector 106 can select the first step model associated with the step and evaluate the sequence of events against the selected step model. The output of the evaluation is a confidence level that the APK is malware or is benign.

The confidence level provided by evaluating the sequence of events against the step model can be compared with a threshold confidence level. In some embodiments, the threshold confidence level can initially be set to a relatively high level, e.g., 90%. If the confidence level exceeds the threshold level, then the classification of the APK can be considered complete. If the APK is classified as malware, then appropriate intervention can take place. For example, the APK can be quarantined, the user alerted as to the presence of malware, etc. If the APK is classified as clean, the APK can be allowed to continue execution.

If the confidence level determined by the step model is not high enough to exceed the threshold, then the malware detector 106 can continue to observe events 118 generated by the APK 120 until the next step in the time and/or event domain is reached. The step model associated with the next step in the time or event domain can be selected, and the sequence of events can be evaluated against the next step model. The evaluation process can be repeated until the end of the steps is reached, in which case the APK can be assumed to be clean. In some embodiments, the threshold confidence level can be lowered with each succeeding step.

Some embodiments allow a user to choose thresholds according to a desired classification behavior and/or latency. For example, the threshold can be chosen to be more aggressive (e.g., faster classification with potentially more mistakes) or less aggressive (e.g., slower classification with potentially fewer mistakes). If the initial confidence thresholds are high, the algorithm may take longer to classify an APK as malware, but may make fewer mistakes in classification. Alternatively, if the initial thresholds are low, the algorithm may quickly classify an APK, but may make more mistakes in classification. Thus, the choice of a confidence threshold can be a tradeoff between accuracy and latency.

Figure 2:
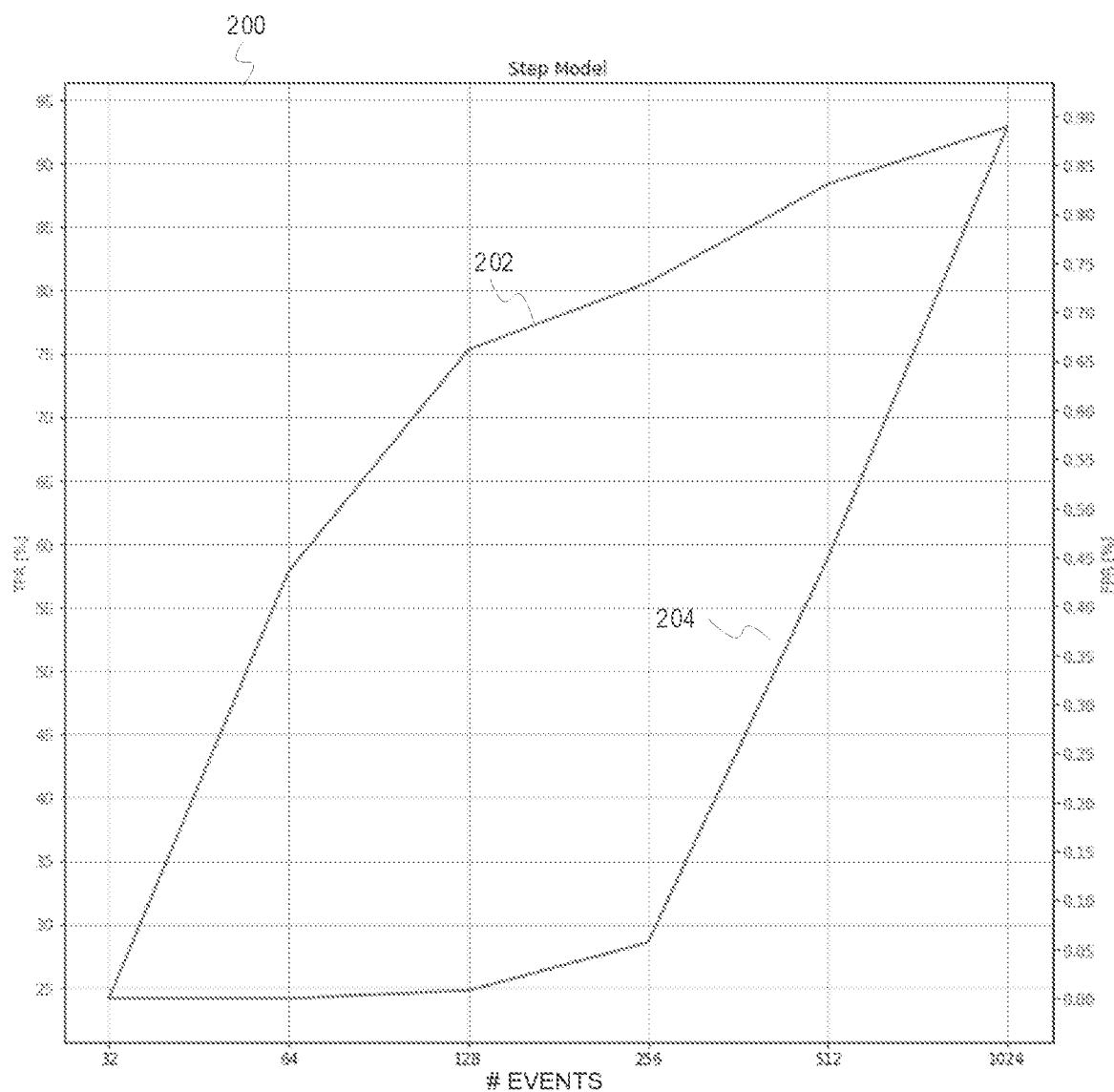
FIG. 2 is an example graph illustrating a true positive rate and a false positive rate for a first set of confidence threshold settings in accordance with one embodiment of the present invention.
Figure 3:
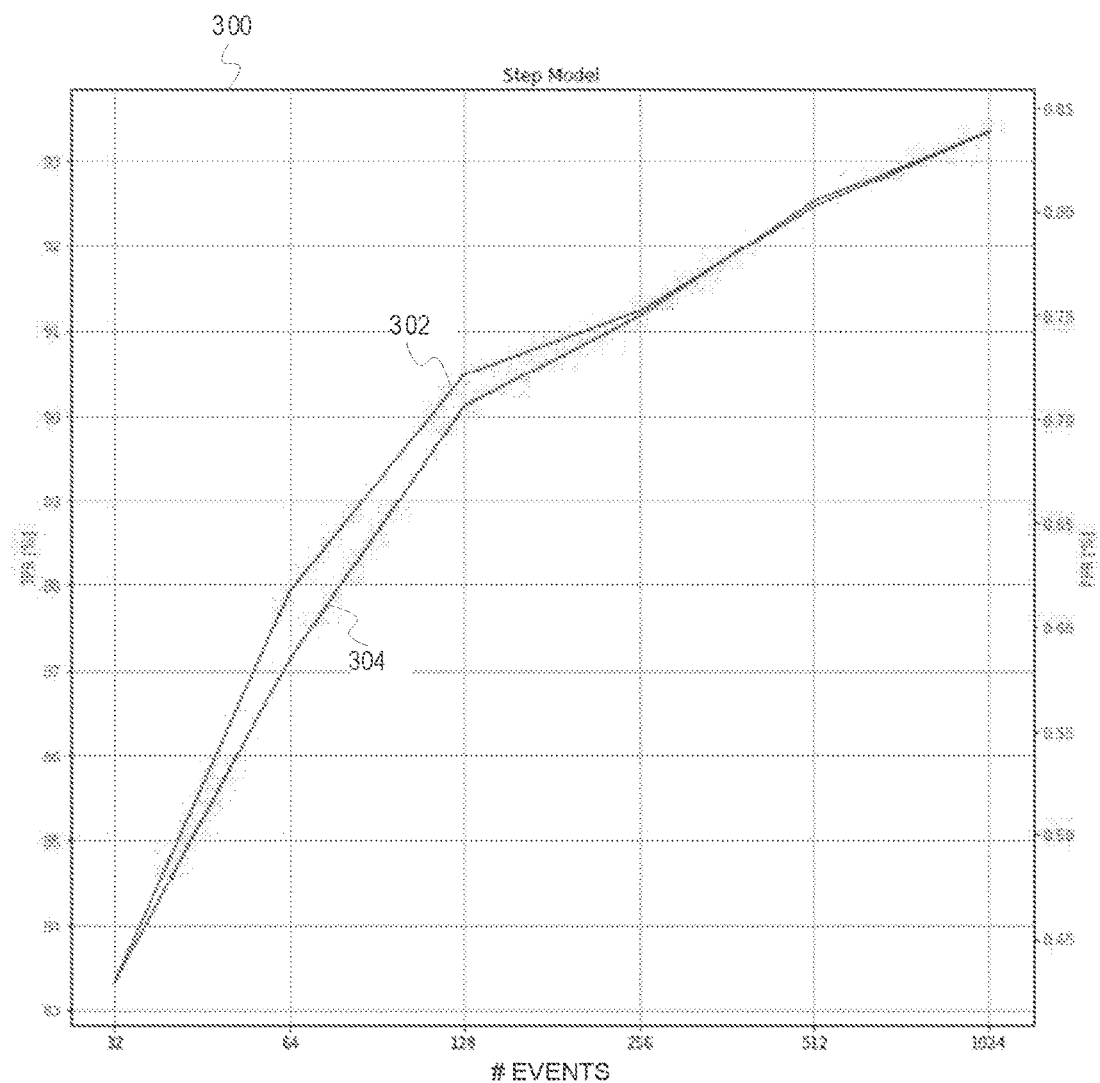
FIG. 3 is an example graph illustrating a true positive rate and a false positive rate for a second set of confidence threshold settings that is more aggressive than the first set of confidence threshold settings used for the graph illustrated in FIG. 2 in accordance with one embodiment of the present invention.
Figure 4:
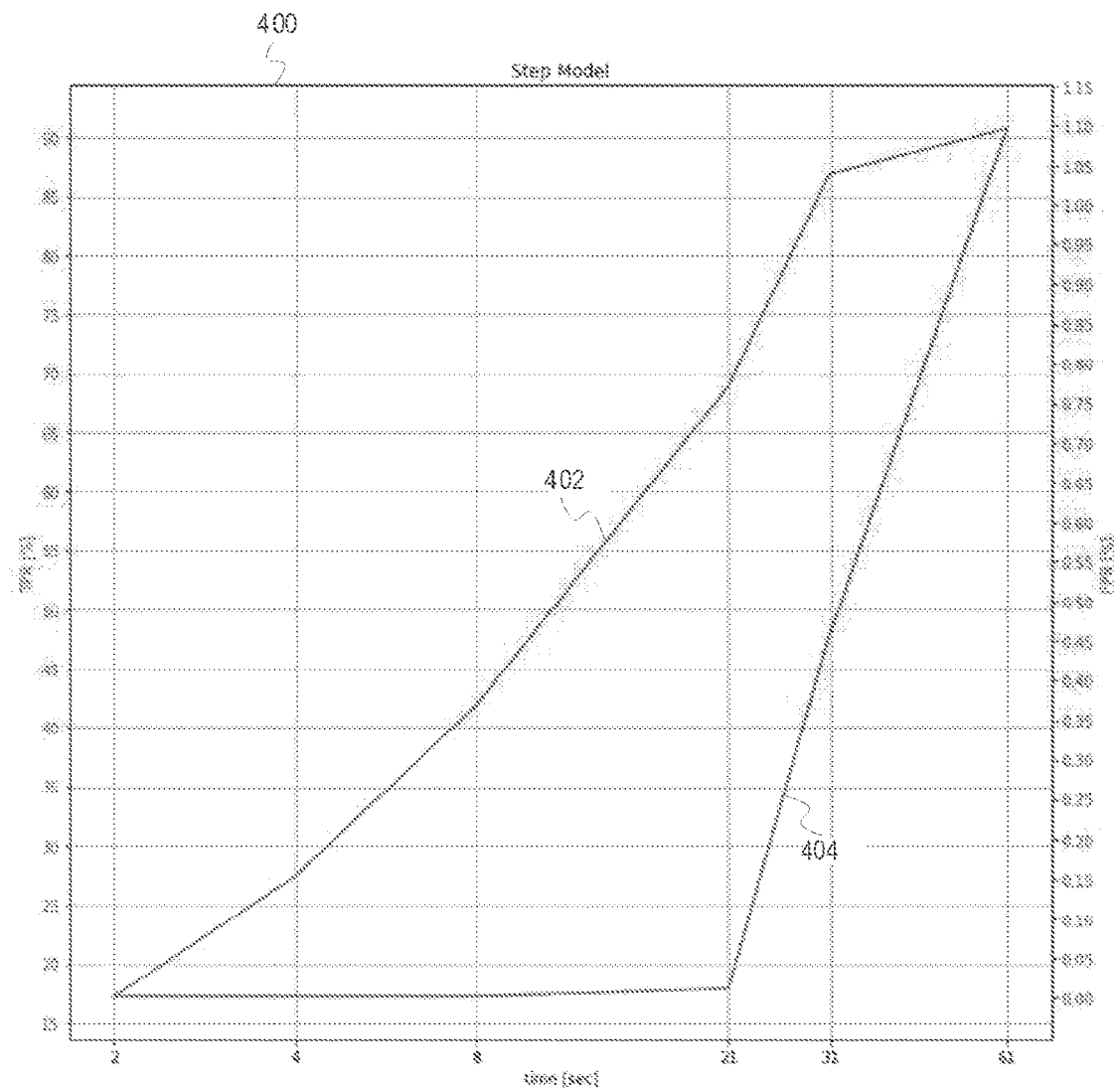
FIG. 4 is an example graph illustrating a true positive rate and a false positive rate for a first set of time threshold settings in accordance with one embodiment of the present invention.
Figure 5:
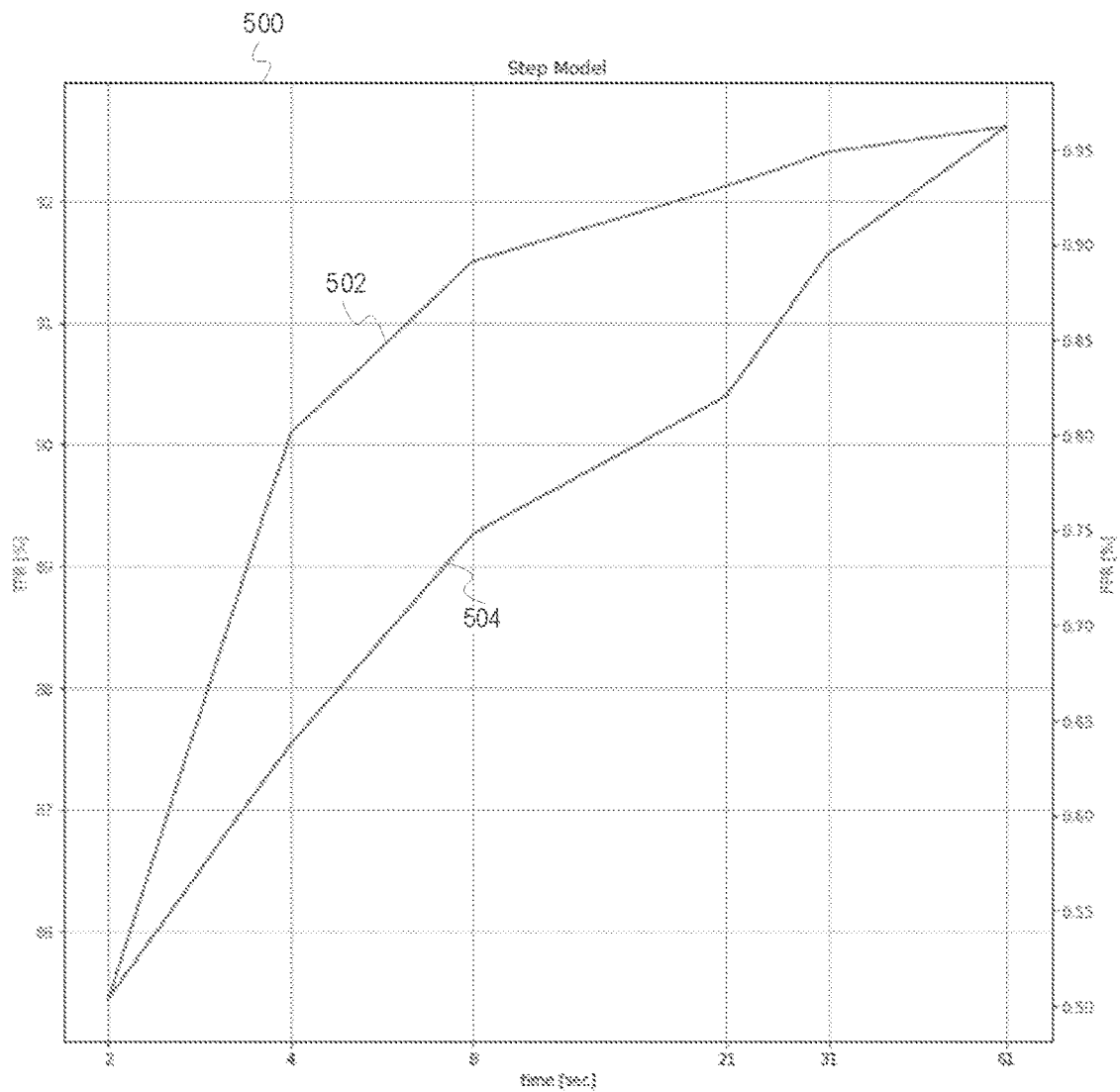
FIG. 5 is an example graph illustrating a true positive rate and a false positive rate for a second set of confidence threshold settings that is more aggressive than the first set illustrated in FIG. 4 in accordance with one embodiment of the present invention.

FIGS. 2-5 are example graphs that illustrate the effect of different threshold settings on the true positive (TP) rate and false positive (FP) rate of example embodiments. FIGS. 2 and 3 illustrate event-based thresholds, and FIGS. 4 and 5 illustrate time-based thresholds.

FIG. 2 is an example graph 200 illustrating a true positive rate 202 and a false positive rate 204 for a first set of confidence threshold settings. In the example illustrated in FIG. 2, a less aggressive set of confidence threshold settings is used. Table 1 illustrates an event step to confidence level relationship associated with graph 200.

TABLE 1

| Event Step | Confidence Level |
|---|---|
| 32 | 0.9998 |
| 64 | 0.99 |
| 128 | 0.8 |
| 256 | 0.6 |
| 512 | 0.4 |
| 1024 | 0.31 |

FIG. 3 is an example graph 300 illustrating a true positive rate 302 and a false positive rate 304 for a second set of confidence threshold settings that is more aggressive than the first set of confidence threshold settings used for the graph illustrated in FIG. 2. Table 2 illustrates an event step to confidence level relationship associated with graph 300.

TABLE 2

| Event Step | Confidence Level |
|---|---|
| 32 | 0.45 |
| 64 | 0.45 |
| 128 | 0.45 |
| 256 | 0.45 |
| 512 | 0.45 |
| 1024 | 0.45 |

FIG. 4 is an example graph 400 illustrating a true positive rate 402 and a false positive rate 404 for a first set of time threshold settings. In the example illustrated in FIG. 4, a less aggressive set of confidence threshold settings is used. Table 3 illustrates a time step to confidence level relationship associated with graph 400.

TABLE 3

| Time Step (Secs) | Confidence Level |
|---|---|
| 2 | 0.9998 |
| 4 | 0.9997 |
| 8 | 0.9995 |
| 21 | 0.92 |
| 31 | 0.39 |
| 61 | 0.3 |

FIG. 5 is an example graph 500 illustrating a true positive rate 502 and a false positive rate 504 for a second set of time threshold settings that is more aggressive than the first set of time threshold settings used for the graph illustrated in FIG. 4. Table 4 illustrates a time step to confidence level relationship associated with graph 500.

TABLE 4

| Time Step (Secs) | Confidence Level |
|---|---|
| 2 | 0.5 |
| 4 | 0.4 |
| 8 | 0.4 |
| 21 | 0.4 |
| 31 | 0.4 |
| 61 | 0.4 |

The coarse evaluation described above where the sequence of events is evaluated at a set number of events or at a set point in time can be efficient, but the latency can be higher than desired by a user. For example, there can be a 31 second wait between seconds 33 and 64 in the time steps. In some embodiments, a continuous evaluation can be performed that evaluates the sequence of events more frequently. For example, the sequence of events can be evaluated using a step model every second, or every 32 events rather than waiting for the next discrete step. Those of skill in the art having the benefit of the disclosure will appreciate that other values besides every second, or every 32 events could be used and are within the scope of the inventive subject matter.

In continuous evaluation, the same step models can be used as those used in coarse evaluation. For instance, in the example described above, the same six step models for the time domain (2, 4, 8, 16, 32, 64) or six step models associated with the event domain (32, 64, 128, 256, 512, 1024) described above can be used for either coarse evaluation or continuous evaluation. The malware detector can select a particular step model to use based on what is considered most appropriate for the particular time or event count. Using a step model that is not an exact match in terms of time and/or events may affect the classification accuracy (i.e., fewer true positives or more false positives), but can result in much lower latency in classification.

Various strategies can be used to determine a step model to use at a particular point in time or at a particular event count. In some embodiments, the malware detector 106 can select the next highest step model. For example, the malware detector 106 can switch to the 16-second step model after the $8^{th}$ second (i.e., at the $9^{th}$ second). Similarly, the malware detector 106 can switch to the 256 event step model after 128 events have occurred. In alternative embodiments, the malware detector 106 can pick the nearest step model. For example, the malware detector 106 can select the 8-second step model during seconds 5 through 12, and the 16-second step model during seconds 13 through 24 and so on. Similarly, the malware detector can select the 256-event step model during events 160 through 384 and so on.

Additionally, there can also be various strategies used to determine threshold confidence levels. For example, in some embodiments, the threshold confidence level can be kept the same even as time or the event count increases. This can be desirable because the confidence level can grow with time, and eventually cross the confidence level threshold. In alternative embodiments, the confidence level threshold can be decreased as time or the event count increases. For example, the threshold confidence level can be determined according to a suitable linear or quadratic function can be determined. In some embodiments, the following function can be used to determine a confidence level threshold:

$$\text{threshold} = 0.96 - 0.72 * ((p/m)**2) \text{ for } p \text{ in the range } (m) \quad (1)$$

where: p=number of events/elapsed time, and
m=total number of events (e.g., 1024)/total time (e.g., 64 seconds).

Figure 6:
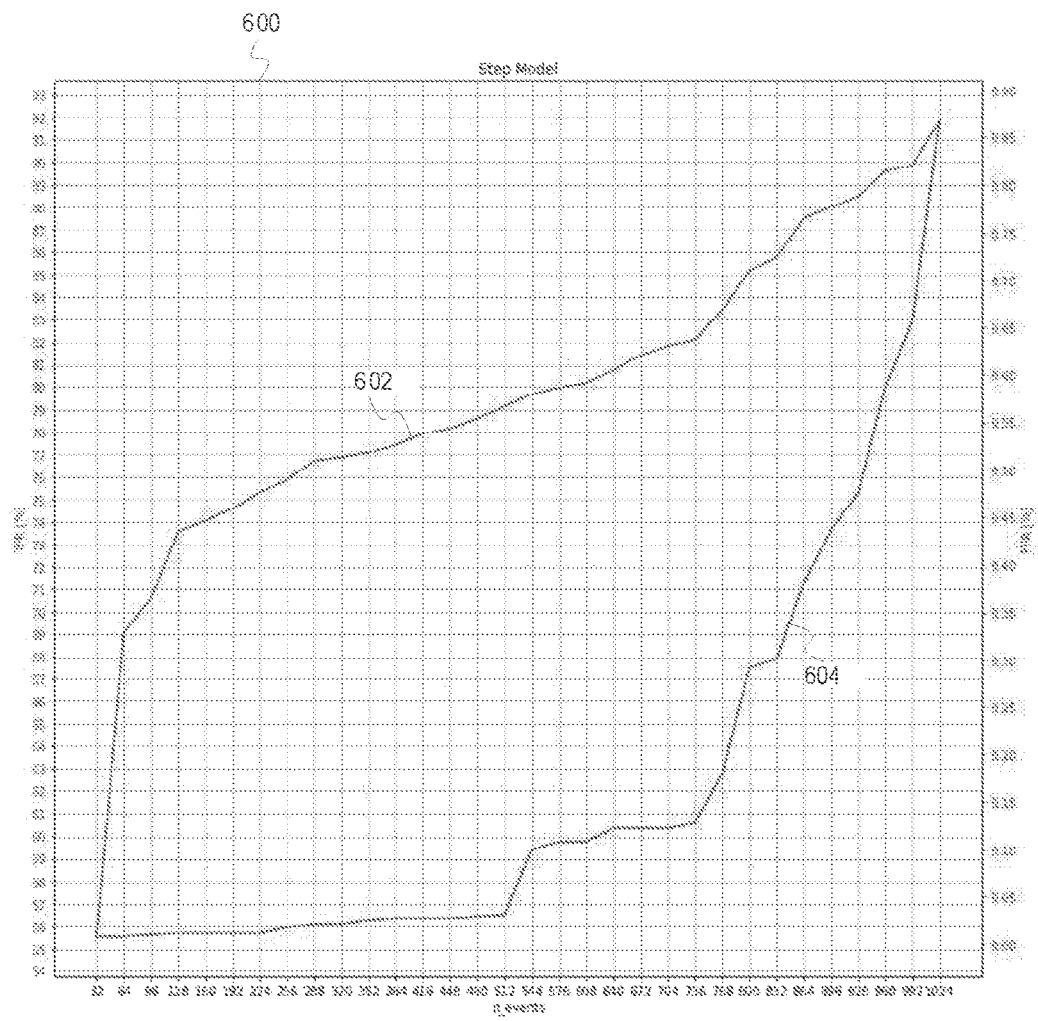
FIG. 6 is an example graph illustrating a true positive rate and a false positive rate during a continuous evaluation of an event sequence for a first set of confidence threshold settings that can be determined using a function to reduce the confidence threshold over time in accordance with one embodiment of the present invention.

FIG. 6 is an example graph 600 illustrating a true positive rate 602 and a false positive rate 604 during a continuous evaluation of an event sequence where the confidence threshold is determined as set forth in Equation 1 above.

Figure 7:
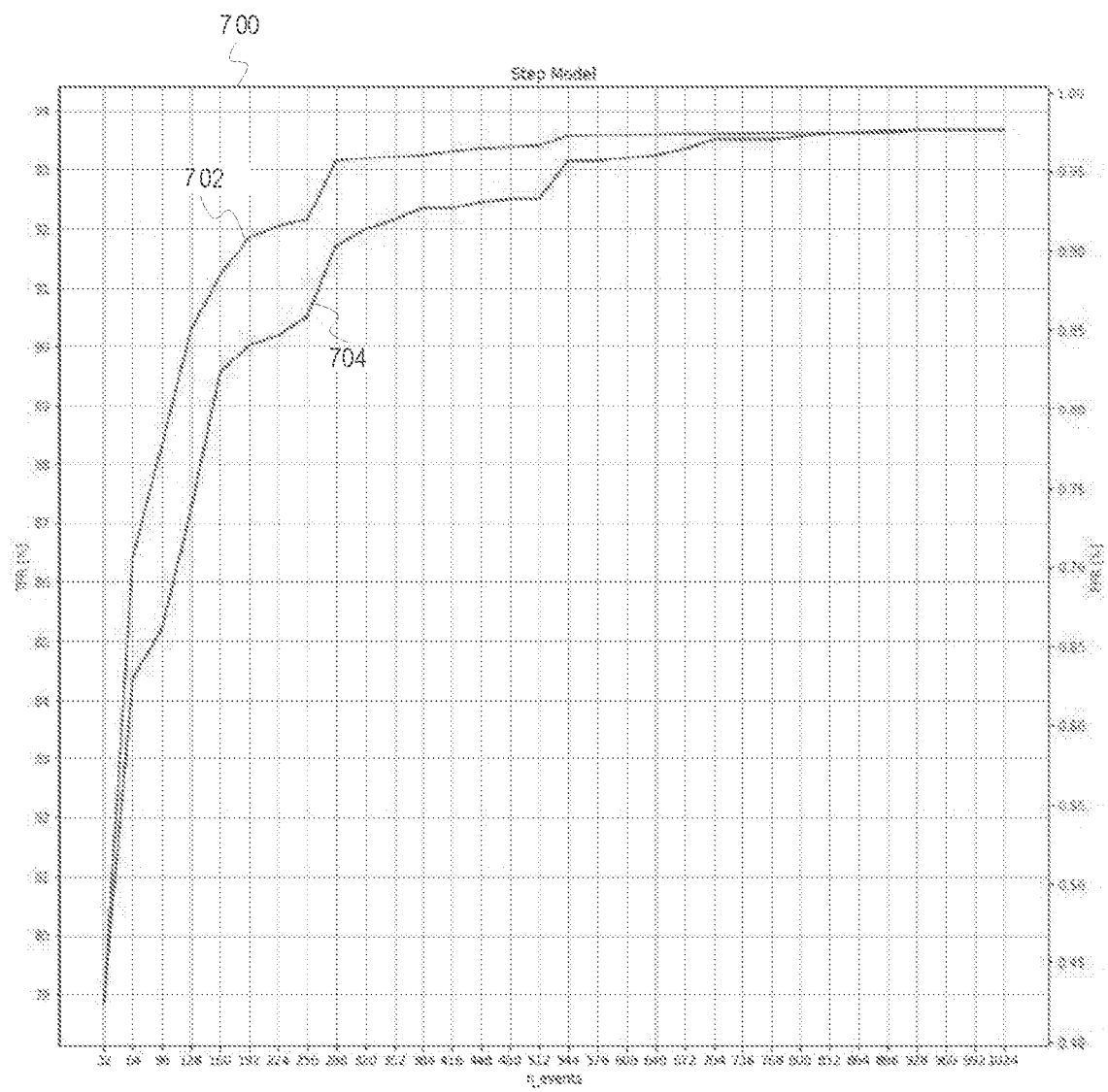
FIG. 7 is an example graph illustrating a true positive rate and a false positive rate during a continuous evaluation of an event sequence for a second set of confidence threshold settings that is kept relatively constant in accordance with one embodiment of the present invention.

FIG. 7 is an example graph 700 illustrating a true positive rate 702 and a false positive rate 704 during a continuous evaluation of an event sequence for a second set of confidence threshold settings where the threshold confidence level is kept constant at 0.47 for each selected step model.

Figure 8:
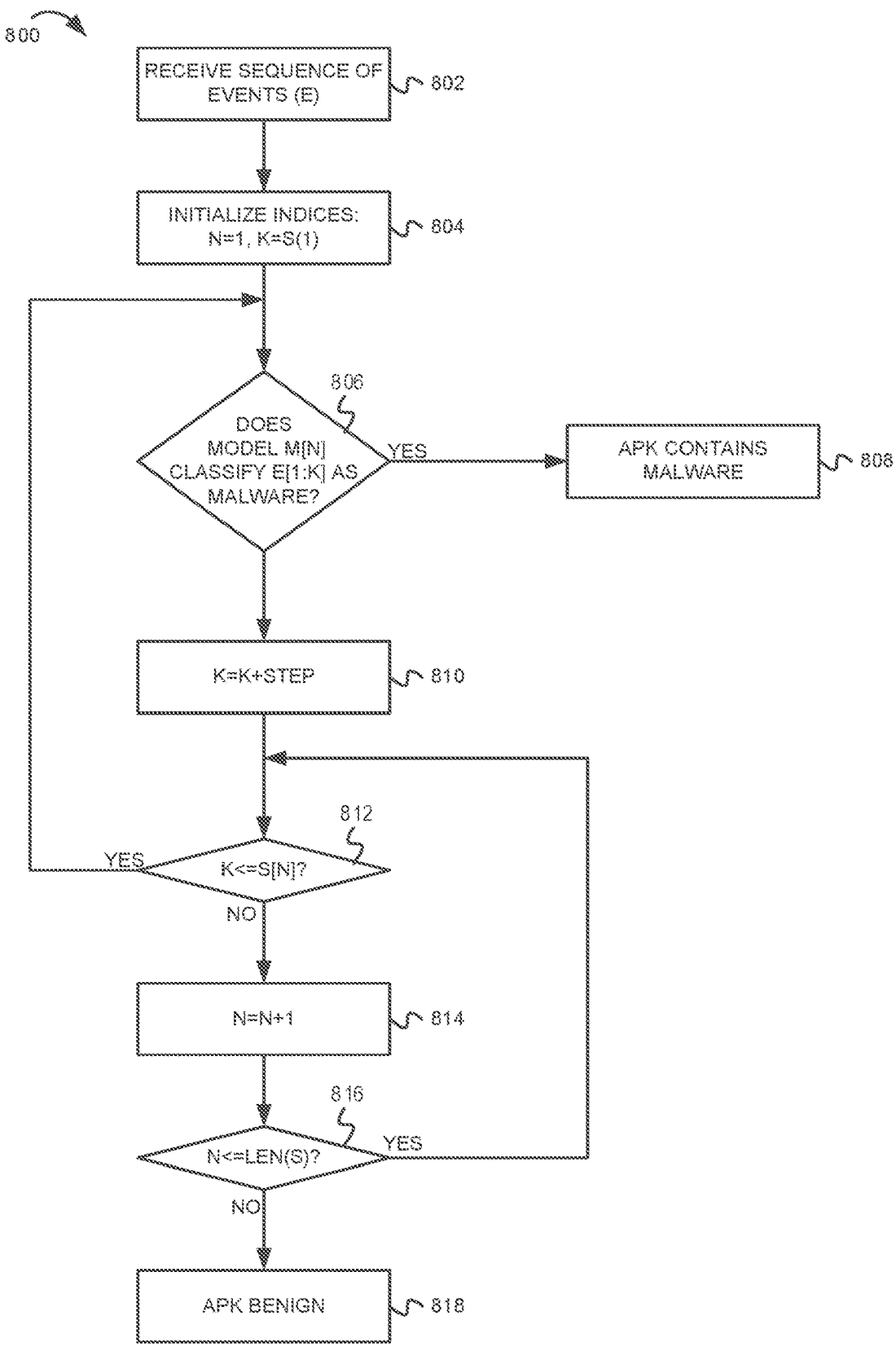
FIG. 8 is a flow chart illustrating operations of a method for continuous evaluation of an event stream using machine learning models in quantized steps in accordance with one embodiment of the present invention.

FIG. 8 is a flow chart 800 illustrating operations of a method for continuous evaluation of an event stream using machine learning models in quantized steps. In the flow chart 800 of FIG. 8 and in the description below, the following symbols are used:

E—a sequence of events. The notation E[1:k] means all events from the $1^{st}$ event to the $k^{th}$, when k<=len(E), and when k>len(E), E=E[1:k]'. This handles the special case when the APK completes execution somewhere in between the steps (e.g., with 50 events). In that case, the model 64 is fed with events 1:50. A special case occurs when there are fewer than 32 events (e.g., the APK finishes execution after 12 events). In that case, K=S(1)=32, but there are not 32 events to feed into the model. So only E[1:12] are fed into the model.

S—list of increasing integers representing event counts or time (seconds)

M—list of step models, where M[n] is a step model trained for sequences of events truncated after $S[n]^{th}$ event or S[n] seconds for n–1 to len(S).

At block 802, the malware detector 106 receives a sequence of events (E). As noted above, the sequence of events can be generated by observing Android Binder transactions, operating system calls, or iOS XPC transactions. The embodiments are not limited to any particular type of event.

At block 804, the malware detector 106 initializes indices and other variables used during the evaluation. For example, index n can be set to one (1) and index k can be set to S(1), the first step point value.

At block 806, the malware detector 106 checks to determine if the currently selected step model M[n] classifies the sequence of events E[1:k] as malware. If so, then the method proceeds to block 808 to indicate that the APK generating the event sequence is, or includes, malware. The method then ends. In response to the determination that the APK is classified as malware, the malware detector 106 can take appropriate action, such as quarantining the APK, alerting the user, halting execution of the APK etc.

If the check at block 806 does not result in a classification of the APK, then flow proceeds to block 810, where the index k is incremented to the next evaluation point. For example, if an evaluation is made every 32 events, k=k+32. Similarly, if an evaluation is made every second, k=k+1. Flow then proceeds to block 812.

At block 812, a check is made to determine if the index k is less than or equal to the current step point. If so, then flow returns to block 806, to reevaluate the now longer sequence of events against the currently selected step model. Otherwise, the new value for index k is greater than the current step point. Flow proceeds to block 814.

At block 814, index n is incremented to point at the next step model. Flow then proceeds to block 816.

At block 816, a check is made to determine if there are any more models left to evaluate (i.e., n<number of step models (len(s)). If no more models are left to evaluate, then flow proceeds to block 818. Otherwise, flow returns to block 812.

Block 818 is reached if none of the step models resulted in a classification of malware. At block 818, the APK is classified as benign. In response to the determination that the APK is classified as benign, the APK can be allowed to continue execution.

Figure 9:
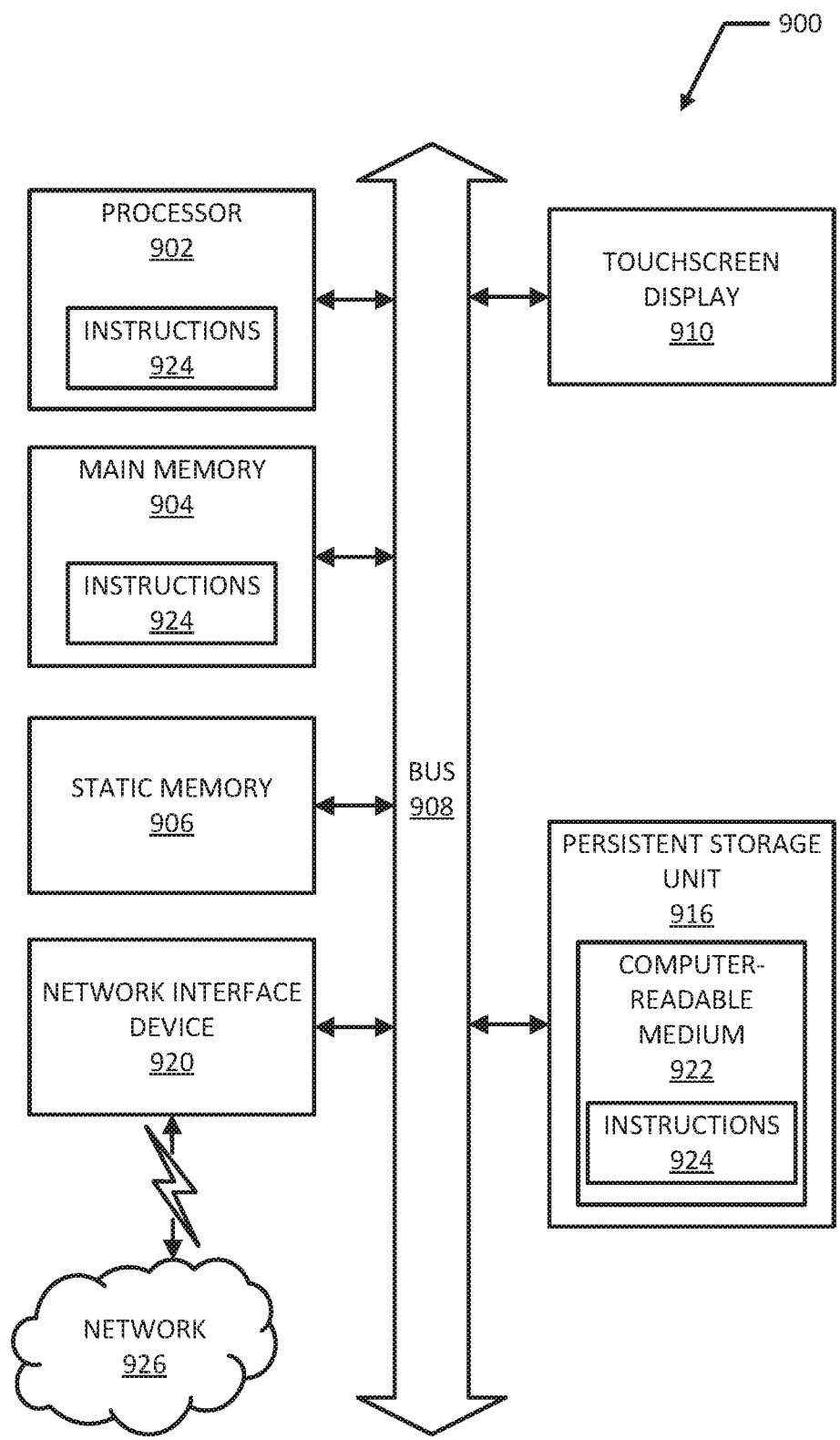
FIG. 9 is a block diagram of an example embodiment of a computer system upon which embodiments of the inventive subject matter can execute.

With reference to FIG. 9, an example embodiment extends to a machine in the example form of a computer system 900 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 900 may include a processor 902 (e.g., a central processing unit (CPU), a graphics processing unit (GPU) or both), a main memory 904 and a static memory 906, which communicate with each other via a bus 908. The computer system 900 may further include a touchscreen display unit 910. In example embodiments, the computer system 900 also includes a network interface device 920.

The persistent storage unit 916 includes a machine-readable medium 922 on which is stored one or more sets of instructions 924 and data structures (e.g., software instructions) embodying or used by any one or more of the methodologies or functions described herein. The instructions 924 may also reside, completely or at least partially, within the main memory 904 or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks. A machine-readable storage medium does not include signals.

The instructions 924 may further be transmitted or received over a communications network 926 using a signal transmission medium via the network interface device 920 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

In some aspects, the inventive subject matter includes a method of applying a machine learning model to an executable file in quantized steps to minimize the latency of on-device detection of malware without sacrificing accuracy. In an embodiment, the method includes generating a first set of events (e.g., series of events 116) by executing one or more training files (e.g., APKs 112). The first set of events is associated with a domain and the events are each associated with a corresponding step point of the domain based on the order in which the events are generated during execution of the training file (e.g., by device emulator 110, by a native device, etc.). A plurality of step models (e.g., set of models 114) are created, for example by machine learning engine 108 observing the first set of events. Each step model is trained for the events of the first set of events associated with a particular step point of the domain. The method further includes generating a second set of events (e.g., sequence of events 118) by executing a second file (e.g., an executable file, APK 120, etc.) on a device (e.g., device 102). The second set of events is associated with the domain and the events are each associated with a corresponding step point of the domain based on the order in which the events are generated during the execution of the second file. Moreover, the method includes applying (e.g., by malware detector 106), on the device, at least two step models of the plurality of step models to the second set of events to generate a confidence level indicative of whether the second file includes malware. Each applied step model is applied to the events of the second set of events associated with the step point for which the step model is trained. Beneficially, by applying the step models to the second file in quantized steps, the latency of generating the confidence level indicative of whether the second file includes malware (e.g., determining whether the second file is malicious) is reduced relative to applying only one model to all of the events of the second set of events. Moreover, by applying the step models to the second file on the device, the latency of generating the confidence level is reduced relative to analyzing the file at a remote location (e.g., in the cloud, etc.).

The method may further include setting a threshold confidence level at a first value or a second value. Setting the threshold confidence level at the first value can reduce the latency of generating the confidence level and decrease the accuracy of the confidence level, and setting the threshold confidence level at the second value can increase the latency of generating the confidence level and increase the accuracy of the confidence level. In some embodiments, the accuracy of the confidence level includes both true positives and false positives. In further embodiments, the method includes stopping execution of the second file (e.g., quarantining the file, etc.) in response to the confidence level exceeding the threshold confidence level and continuing execution of the second file in response to the confidence level not exceeding the threshold confidence level. In some embodiments, the method includes a coarse execution in which each applied step model is applied to the events of the second set of events when the step point associated with the events matches the step point for which the step model is trained. In alternative embodiments, the method includes a continuous execution in which each applied step model is applied to the events of the second set of events when the step point associated with the events is in between step points for which the step models are trained. The latency of generating the confidence level during the continuous execution may be reduced relative to generating the confidence level during the coarse execution. The domain may be either a time domain or an event domain.

In another embodiment, a system includes a device emulator (e.g., device emulator 110, a native device, etc.), a machine learning engine (e.g., machine learning engine 108), and a device (e.g., device 102). The device emulator is configured to generate a first set of events (e.g., series of events 116) by executing one or more training files (e.g., APKs 112). The first set of events is associated with a domain and the events are each associated with a corresponding step point of the domain based on the order in which the events are generated during execution of the training files. The machine learning engine is configured to receive the first set of events and create a plurality of step models (e.g., set of models 114). Each step model is trained for the events of the first set of events associated with a particular step point of the domain. The device includes a software environment (e.g., software environment 104) and a malware detector (e.g., malware detector 106). The software environment is configured to generate a second set of events (e.g., sequence of events 118) by executing a second file (e.g., an executable file, APK 120, etc.) on the device. The second set of events is associated with the domain and the events are each associated with a corresponding step point of the domain based on the order in which the events are generated during the execution of the second file. The malware detector is configured to receive the plurality of step models, receive the second set of events, and apply at least two step models of the plurality of step models to the second set of events to generate a confidence level indicative of whether the second file includes malware. Each applied step model is applied to the events of the second set of events associated with the step point for which the step model is trained.

In yet another embodiment, a non-transitory computer readable storage medium (e.g., machine-readable medium 922, etc.) includes a set of instructions (e.g., instructions 924, etc.) executable by a computer (e.g., computer system 900, device 102, etc.). The non-transitory computer readable storage medium includes instructions for generating a first set of events (e.g., series of events 116) by executing one or more training files (e.g., APKs 112). The first set of events is associated with a domain and the events are each associated with a corresponding step point of the domain based on the order in which the events are generated during execution of the training file (e.g., by device emulator 110, by a native device, etc.). Instructions are also included for creating a plurality of step models (e.g., set of models 114), for example by machine learning engine 108 observing the first set of events. Each step model is trained for the events of the first set of events associated with a particular step point of the domain. The non-transitory computer readable storage medium further includes instructions for generating a second set of events (e.g., sequence of events 118) by executing a second file (e.g., an executable file, APK 120, etc.) on a device (e.g., device 102). The second set of events is associated with the domain and the events are each associated with a corresponding step point of the domain based on the order in which the events are generated during the execution of the second file. Moreover, the non-transitory computer readable storage medium includes instructions for applying (e.g., by malware detector 106), on the device, at least two step models of the plurality of step models to the second set of events to generate a confidence level indicative of whether the second file includes malware. Each applied step model is applied to the events of the second set of events associated with the step point for which the step model is trained.

In another embodiment, a method includes generating a first set of events (e.g., series of events 116) by executing one or more training files (e.g., APKs 112). The first set of events is associated with a domain and the events are each associated with a corresponding step point of the domain based on the order in which the events are generated during execution of the training file (e.g., by device emulator 110, by a native device, etc.). A plurality of step models (e.g., set of models 114) are created, for example by machine learning engine 108 observing the first set of events. Each step model is trained for the events of the first set of events associated with a particular step point of the domain. The method further includes providing the plurality of step models to a computing device (e.g., device 102) via a communication network (e.g., communications network 926). At least two step models of the plurality of step models are applied to a second set of events (e.g., sequence of events 118) to generate a confidence level indicative of whether a second file executing on the computing device includes malware. The second set of events are generated by executing the second file (e.g., an executable file, APK 120, etc.) on the computing device. The second set of events is associated with the domain and the events are each associated with a corresponding step point of the domain based on the order in which the events are generated during the execution of the second file. Moreover, each applied step model is applied to the events of the second set of events associated with the step point for which the step model is trained.

In yet another embodiment, a method includes receiving, by a device (e.g., device 102), a plurality of step models via a communications network (e.g., communications network 926). Each step model is trained for events of a first set of events, series of events 116) that were generated by executing a training file (e.g., APKs 112). The first set of events is associated with a domain and the events are each associated with a corresponding step point of the domain based on the order in which the events are generated during execution of the training file (e.g., by device emulator 110, by a native device, etc.). Each step model is trained for the events of the first set of events associated with a particular step point of the domain. The method further includes generating a second set of events (e.g., sequence of events 118) by executing a second file (e.g., an executable file, APK 120, etc.) on the device. The second set of events is associated with the domain and the events are each associated with a corresponding step point of the domain based on the order in which the events are generated during the execution of the second file. Moreover, the method includes applying (e.g., by malware detector 106), on the device, at least two step models of the plurality of step models to the second set of events to generate a confidence level indicative of whether the second file includes malware. Each applied step model is applied to the events of the second set of events associated with the step point for which the step model is trained.

Although an overview of the inventive subject matter has been described with reference to specific example embodiments, various modifications and changes may be made to these embodiments without departing from the broader scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art.

What is claimed is:

1. A method comprising:
   generating a first set of events by executing one or more training files, wherein the first set of events is associated with a domain, and wherein the events of the first set of events are each associated with a corresponding step point of the domain based on the order in which the events are generated during the execution of the training file;

creating a plurality of step models, wherein each step model is trained for the events of the first set of events associated with a particular step point of the domain;

generating a second set of events by executing a second file on a device, wherein the second set of events is associated with the domain, and wherein the events of the second set of events are each associated with a corresponding step point of the domain based on the order in which the events are generated during the execution of the second file; and applying, on the device, at least two step models of the plurality of step models to the second set of events to generate a confidence level indicative of whether the second file includes malware, wherein each applied step model is applied to the events of the second set of events associated with the step point for which the step model is trained; and wherein each applied step model is applied to the events of the second set of events when the step point associated with the events is in between step points for which the step models are trained, whereby a latency of said generating the confidence level indicative of whether the second file includes the malware is reduced relative to applying each applied step model to the events when the step point associated with the events matches the step point for which the step model is trained.

2. The method of claim 1, further comprising setting a threshold confidence level at a first value or a second value, wherein setting the threshold confidence level at the first value reduces a latency and decreases an accuracy of said generating the confidence level indicative of whether the second file includes the malware, and wherein setting the threshold confidence level at the second value increases the latency and increases the accuracy of said generating the confidence level indicative of whether the second file includes the malware.

3. The method of claim 2, wherein the accuracy of said generating the confidence level indicative of whether the second file includes the malware includes true positives and false positives.

4. The method of claim 2, wherein, in response to the confidence level being greater than or equal to the threshold confidence level, stopping execution of the second file, and wherein, in response to the confidence level being less than the threshold confidence level, continuing execution of the second file.

5. The method of claim 1, wherein each applied step model is applied to the events of the second set of events when the step point associated with the events matches the step point for which the step model is trained.

6. The method of claim 1, wherein the domain comprises at least one of a time domain and an event domain.

7. A system comprising:
a device emulator configured to generate a first set of events by executing one or more training files, the first set of events associated with a domain, and the events of the first set of events each associated with a corresponding step point of the domain based on the order in which the events are generated during the execution of the training file;
a machine learning engine configured to receive the first set of events and create a plurality of step models, each step model being trained for the events of the first set of events associated with a particular step point in the domain; and
a device, the device comprising:
a software environment configured to generate a second set of events by executing a second file, the second set of events associated with the domain, and the events of the second set of events each associated with a corresponding step point of the domain based on the order in which the events are generated during the execution of the second file; and
a malware detector configured to:
receive the plurality of step models;
receive the second set of events; and
apply at least two step models of the plurality of step models to the second set of events to generate a confidence level indicative of whether the second file includes malware, wherein each applied step model is applied to the events of the second set of events associated with the step point for which the step model is trained; and wherein each applied step model is applied to the events of the second set of events when the step point associated with the events is in between step points for which the step models are trained, whereby a latency of said generating the confidence level indicative of whether the second file includes the malware is reduced relative to applying each applied step model to the events when the step point associated with the events matches the step point for which the step model is trained.

8. The system of claim 7, wherein the malware detector is further configured to set a threshold confidence level at a first value or a second value, wherein setting the threshold confidence level at the first value reduces a latency and decreases an accuracy of said generating the confidence level indicative of whether the second file includes the malware, and wherein setting the threshold confidence level at the second value increases the latency and increases the accuracy of said generating the confidence level indicative of whether the second file includes the malware.

9. The system of claim 8, wherein the accuracy of said generating the confidence level indicative of whether the second file includes the malware includes true positives and false positives.

10. The system of claim 8, wherein the software environment is further configured to:
in response to the confidence level being greater than or equal to the threshold confidence level, stop execution of the second file; and
in response to the confidence level being less than the threshold confidence level, continue execution of the second file.

11. The system of claim 7, wherein each applied step model is applied to the events of the second set of events when the step point associated with the events matches the step point for which the step model is trained.

12. The system of claim 7, wherein the domain comprises at least one of a time domain and an event domain.

13. A non-transitory computer readable storage medium comprising a set of instructions executable by a computer, the non-transitory computer readable storage medium comprising:
instructions for generating a first set of events by executing one or more training files, wherein the first set of events is associated with a domain, and wherein the events of the first set of events are each associated with a corresponding step point of the domain based on the order in which the events are generated during the execution of the training file;

instructions for creating a plurality of step models, wherein each step model is trained for the events of the first set of events associated with a particular step point of the domain;

instructions for generating a second set of events by executing a second file, wherein the second set of events is associated with the domain, and wherein the events of the second set of events are each associated with a corresponding step point of the domain based on the order in which the events are generated during the execution of the second file; and instructions for applying at least two step models of the plurality of step models to the second set of events to generate a confidence level indicative of whether the second file includes malware, wherein each applied step model is applied to the events of the second set of events associated with the step point for which the step model is trained and wherein each applied step model is applied to the events of the second set of events when the step point associated with the events is in between step points for which the step models are trained, whereby a latency of said generating the confidence level indicative of whether the second file includes the malware is reduced relative to applying each applied step model to the events when the step point associated with the events matches the step point for which the step model is trained.

14. The non-transitory computer readable storage medium of claim 13, further comprising instructions for setting a threshold confidence level at a first value or a second value, wherein setting the threshold confidence level at the first value reduces a latency and decreases an accuracy of said generating the confidence level indicative of whether the second file includes the malware, and wherein setting the threshold confidence level at the second value increases the latency and increases the accuracy of said generating the confidence level indicative of whether the second file includes the malware.

15. The non-transitory computer readable storage medium of claim 14, wherein the accuracy of said generating the confidence level indicative of whether the second file includes the malware includes true positives and false positives.

16. The non-transitory computer readable storage medium of claim 14, further comprising instructions for:

in response to the confidence level being greater than or equal to the threshold confidence level, stopping execution of the second file; and in response to the confidence level being less than the threshold confidence level, continuing execution of the second file.

17. The non-transitory computer readable storage medium of claim 13, wherein each applied step model is applied to the events of the second set of events when the step point associated with the events matches the step point for which the step model is trained.

18. The non-transitory computer readable storage medium of claim 13, wherein the domain comprises at least one of a time domain and an event domain.

* * * * *